F. R. LAUNE.
SAGE BRUSH PULLING MACHINE.
APPLICATION FILED OCT. 1, 1910.

995,356.

Patented June 13, 1911.

F. R. LAUNE.
SAGE BRUSH PULLING MACHINE.
APPLICATION FILED OCT. 1, 1910.

995,356.

Patented June 13, 1911.

Witnesses
Otto E. Hoddick.
C. H. Roessner.

Inventor
F. R. Laune.
By 
Attorney

UNITED STATES PATENT OFFICE.

FINLEY R. LAUNE, OF LOVELAND, COLORADO.

SAGE-BRUSH-PULLING MACHINE.

995,356.

Specification of Letters Patent. Patented June 13, 1911.

Application filed October 1, 1910. Serial No. 584,921.

*To all whom it may concern:*

Be it known that I, FINLEY R. LAUNE, a citizen of the United States, residing at Loveland, county of Larimer, and State of Colorado, have invented certain new and useful Improvements in Sage-Brush-Pulling Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention aims to provide a mechanism designed to be expeditiously and continuously operated to clear land of sage brush, greasewood, cactus, rushes or similar varieties of natural grown vegetation, preliminary to preparing the land for cultivation.

The machine is operated to remove the growth in swaths, automatically pulling or grubbing up the same by the roots, thereby arresting further propagation, and bunching and depositing the crop in windrows or heaps, when drawn over the brush-grown land by draft animals, operating continuously by first catching and pulling the brush over which it passes, holding it in the pulling tooth bars, carrying it to the rear end of the machine and automatically dumping it, thus performing the several functions of pulling, raking and windrowing or heaping the brush automatically and continuously by means of the motive power operating the machine.

The machine as now constructed and herein described requires but one person and the necessary number, four or more, draft horses for its operation. The machine may be of a wider or narrower swath capacity, affording a construction best adapted to meet the specific conditions and requirements of practice.

It will be understood that while the machine herein described is designed to be operated by draft animals, substantially the same construction may be operated by other motive power, as steam, gasolene or other motor, suitably attached thereto or mounted upon and incorporated into the construction thereof. A detail description of this auto-motor construction, however, is intended to form the subject matter of a separate application for Letters Patent.

I attain these results by the mechanism described herein and illustrated in the accompanying drawings forming a part of this specification, to which reference is made and in which:

Fig. 2 is a plan view of the machine, corresponding with the parts shown in Fig. 1. In this figure the endless carrying chain and adjacent sprocket wheels, upon the upper or left hand side of the construction, are shown in detail sectional plan taken on line V—V of Fig. 1. Fig. 3 is a detail, detached side elevation of the main driving shaft or axle, showing the adjacent construction in section on the central vertical plane of the shaft, and on a larger scale. Fig. 3ª is a cross section taken in the line z—z of Fig. 3. Fig. 9 is an enlarged detail side elevation of a removable, driving wheel, traction tooth, in which the wheel clamping jaw flanges are shown partly in vertical section. Fig. 11 is a detail side elevation of a part of the drive sprocket, carrying chain and angular attaching bar, illustrating the adjusting function of these parts when moving around the sharp turn of the drive sprockets.

Similar reference characters indicate corresponding parts through the several figures.

The machine as herein shown is designed to be constructed entirely of iron and steel excepting the seat platform, draft tongue and four-horse evener or double-tree, which are preferably made of wood.

A rectangular, horizontally disposed frame A, formed preferably of standard iron or steel angle bars, comprises the longitudinally disposed side beams $A^1$, $A^1$, and the rear end cross beam $A^2$, suitably mounted upon which is the operating mechanism. A main traction-wheel axle or driving shaft B, transversely disposed upon the frame, is mounted in suitable bearings C, C, which are bolted to the side beams $A^1$, $A^1$, near the forward ends of the same. The driving shaft or axle B is formed of a steel bar of uniform square cross section through its entire length, except a portion of the extreme left-hand end, as shown in Fig. 3, which is cylindrical, forming a carrying wheel spindle $B^1$ for the purpose herein explained. Revolubly mounted in depending boxes $c^1$, $c^1$, of the main shaft bearings C, C, are elongated sleeves D, D, each of which has formed upon one end an annular flange $d^1$. These flanged ends are respectively outwardly disposed when assembled within the bearings as shown in Fig. 3, and are designed to take thrust bearing against the respective outer sides of the depending boxes $c^1$, $c^1$. A longitudinally disposed square hole $d^2$ is formed in each of the elongated sleeves, of such cross section dimension as to register accurately with the squared main driving shaft B, which is mounted therein and takes therewith axial bearing within the boxes $c^1$, $c^1$.

Mounted upon the extreme right-hand end of the driving shaft B in fixed revoluble relation therewith, is a main traction driving wheel E, which is constructed entirely of iron and steel, for the purpose of securing maximum strength. The cast iron hub $e^1$ is firmly supported within the rim $e^2$ by staggered steel spokes $e^3$. A longitudinally disposed square hole $e^4$ is formed in the hub $e^1$ which registers accurately with the squared driving shaft B, upon which the wheel is securely mounted and held in place by a set screw collar $b^2$. This traction wheel and driving shaft rotate together at all times when the machine is in operation, thereby transmitting the draft power to the operative mechanism. Securely clamped upon the rim $e^2$ of the driving wheel E is a suitable number of adjustable and removable traction teeth F, F, designed to prevent slipping of the traction wheel when the machine is in operation. This tooth (see Fig. 9), is a triangular-shaped casting upon the base of which is formed a transverse slot $f^1$, disposed in the arc of a circle concentric with the curvature of the traction wheel rim, over the edge of which it is fitted. The points of the teeth project in planes radial to the center of the wheel and are supported in positions perpendicular to the periphery of the rim by a wide angular flange $f^2$. The tooth is clamped to the wheel by the curved end of a hooked bolt $f^3$ engaging the opposite edge of the rim and having the threaded nut end of the same carried through a hole $f^4$ formed in the casting adjacent to the base. These teeth are designed to be readily removable when the machine is to be transported upon a highway.

A carrying wheel G, in construction and dimensions a duplicate of the main traction driving wheel E, except that a round longitudinally disposed hole $g^4$ formed in the hub $g^1$, is mounted upon the main shaft spindle $B^1$ and rotates therewith or has free axial rotation thereupon, as the case may be. This wheel is secured in place upon the spindle $B^1$ by a set screw collar $b^3$. Inasmuch as the single driving wheel E affords the traction power necessary to actuate the operative mechanism, the carrying wheel G is purposely mounted to rotate independently upon the driving shaft spindle and thereby facilitate the movement of turning corners, etc., with the machine.

Fitted onto the driving shaft B between and immediately adjacent to the sleeves D, D, are two sprocket wheels H, H, in which are formed square holes $h^1$, $h^1$, which register accurately with the square driving shaft and which sprockets rotate therewith. These sprockets are secured in their respective positions upon the shaft by set screw collars $b^4$, $b^4$. Adjustably bolted to the side beams $A^1$, $A^1$, between the driving shaft B and the rear cross beam $A^2$, are two depending, shaft-supporting boxes I, I, within which is fixedly mounted a transversely disposed sprocket-carrying shaft J, the ends of which are secured in the boxes by set screws $i^1$, $i^1$. Mounted upon this shaft between and immediately adjacent to the respective supporting boxes I, I, are two sprocket wheels K, K, in longitudinal alinement with the two driving shaft sprockets H, H. The sprockets K, K, are formed with extended hubs $k^1$, $k^1$, Fig. 5, and rotate freely upon the shaft J taking axial bearing thereupon, and are secured in their positions of proper alinement by means hereinafter explained.

Mounted upon each pair of sprocket wheels H and K, is a detachable link endless carrying chain L. These chains are longitudinally disposed adjacent to the side beams $A^1$, $A^1$, within the frame A, Fig. 2. To these endless carrying chains L, L, are attached any required number of pulling bars M, uniformly spaced thereupon and transversely disposed within the frame, or at right angles to the carrying chains. In the drawings, Figs. 1 and 2, I show four pulling bars M, M, M, and M, respectively, attached to the carrying chains. The commercially well known standard construction of detachable sprocket-link chain is especially well adapted to meet the requirements of practice in this particular detail of my construction, for the reason that, depending upon the density of the brush growth, it may be desirable in an operative emergency to remove from or add to the endless chains L, L, one or more of the pulling bars M, and inasmuch as such change must in all probability be made in a field of operation popularly known as a "new country," located remote from industrial centers or transportation terminals, the detachable link construction is of especial utility in making these changes under such local conditions.

Figures 1, 3A, 10:
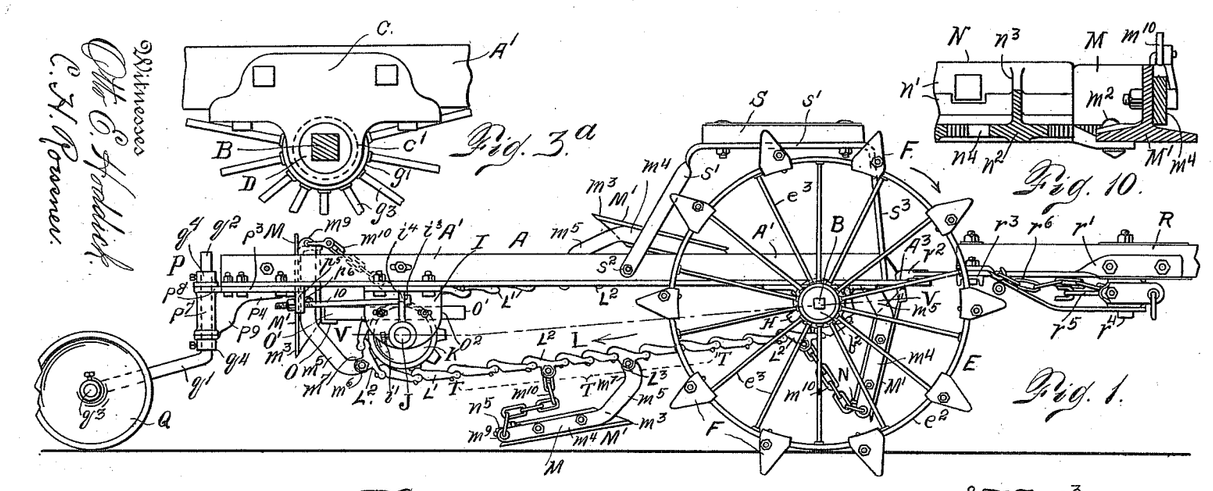
Figure 1 is a side elevation of the machine, the front and rear ends being broken away for want of space on the sheet to accommodate the figure.
Fig. 10 is an enlarged sectional elevation of a detail of the pulling bar construction, taken on line &—& of Fig. 7.

Each endless chain L, L, shown in the drawings comprises forty detachable links $L^1$, $L^1$, and $L^2$, $L^2$. This number may be varied, depending upon the structural and operative capacity of the machine. With four pulling bars attached as shown in Fig. 1, ten links of the chain would be considered a "section" apportioned to each pulling bar, as indicated by the brace line T, T, T, adjacent to the lower, centrally located pulling bar M. If, however, five pulling bars were required in order to insure their being uniformly spaced upon the endless chains of forty links each, the required number of links being removed from each section and again replaced as the fifth bar section, would give under eight-link sections a uniform spacing of the five pulling bars, as clearly shown in Fig. 8, comprised within the brace line U, U, U. As will be understood, these alterations can be readily made in the field of operation if necessary without requiring special tools for the purpose. Considering the operative conditions likely to prevail, I attach special importance to the features of novel utility and economy arising from the use of the detachable link chain in the work of altering, assembling and operating my improved construction.

Figure 2:
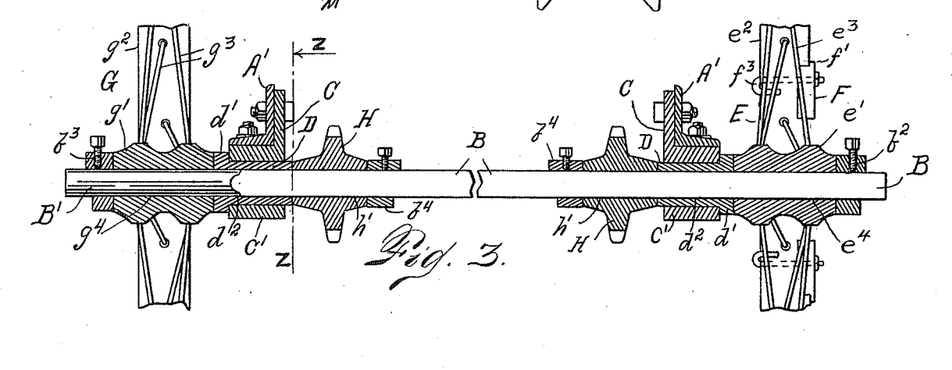
Figures 4, 5, 6, 7:
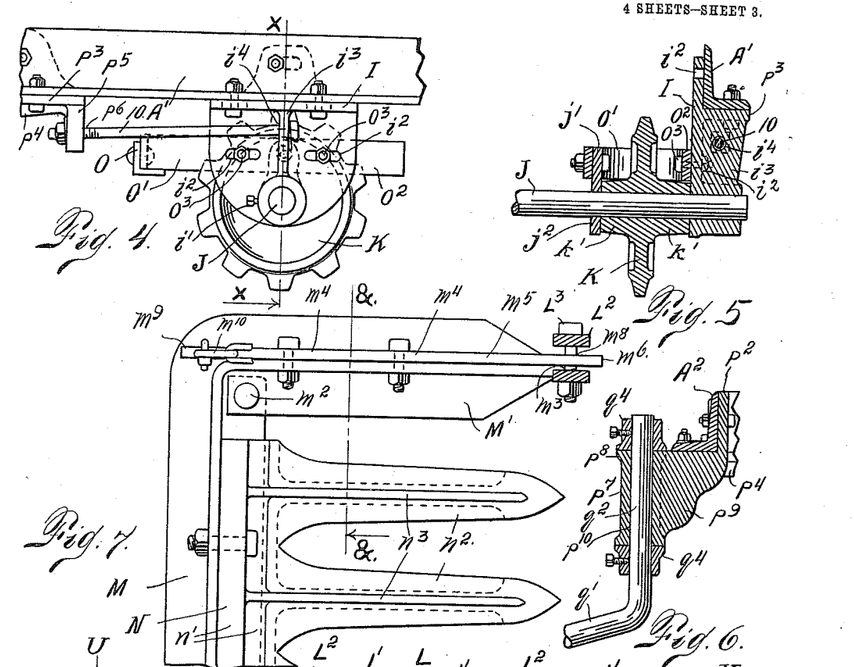
Fig. 4 is an enlarged side elevation of the rear sprocket shaft, adjustably supported bracket box, showing in broken lines the take-up adjustment of the same for slack occurring in the carrying chains. An adjustable clearing bar is also shown in side elevation in this figure.
Fig. 5 is a central vertical section of the detail shown in Fig. 4, taken on line X—X of that figure.
Fig. 6 is a central vertical section of the bracket box casting within which the trailing wheel shaft is mounted, taken on line Y—Y of Fig. 2.
Fig. 7 is an enlarged detail plan view, showing a portion of the pulling bar construction.
Figure 8:
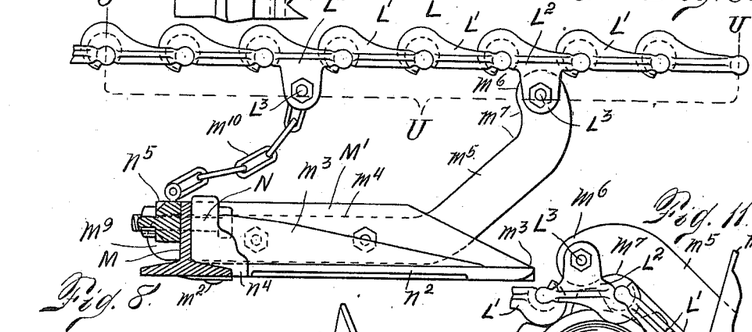
Fig. 8 is a side elevation of the pulling bar construction, corresponding with the detail shown in Fig. 7, a part of the construction being shown in section taken on line W—W of Fig. 2. A section of the carrying chain is also shown in this figure in enlarged side elevation, and the means of attaching the same to the pulling bar construction.
Figure 12:
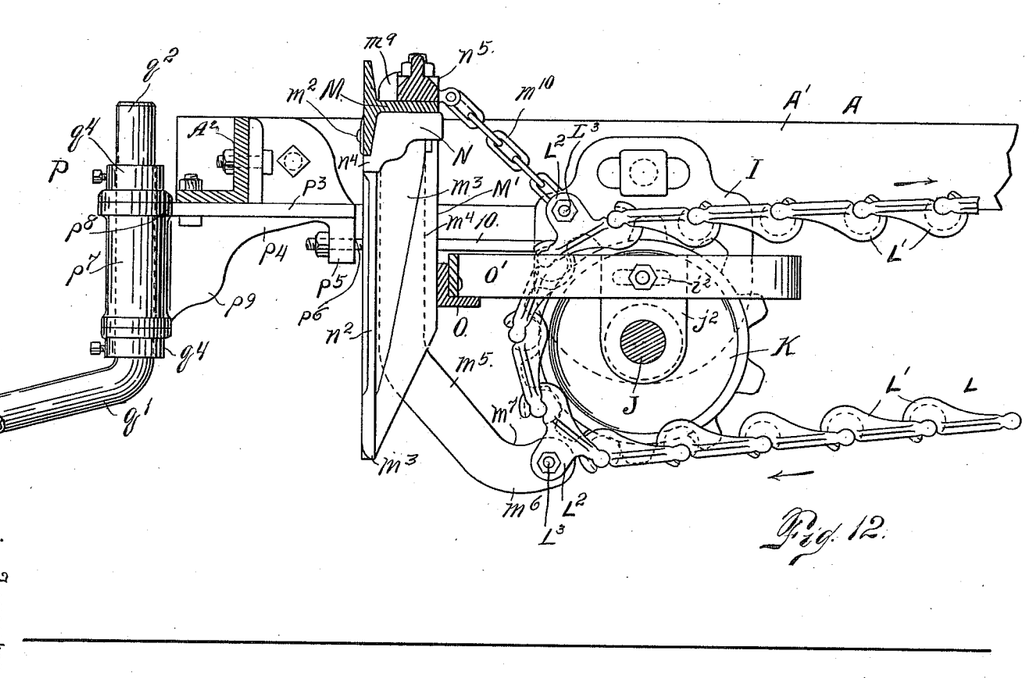
Fig. 12 is a longitudinal sectional view of the rear end of the machine taken on the line 12—12 Fig. 2, looking in the direction of the arrow.

The main carrying portion of the pulling bars M is constructed preferably of a bar of standard T-iron of suitable dimensions and length. At a predetermined distance from each end of the bar the base flange on one side is notched to the central vertical rib, permitting the ends thus formed upon the flange to be overlapped and suitably interlocked by rivets $m^2$, when the end portions of the bar are forged around to a position at right angles with the intermediate body portion as shown in Fig. 7, thus forming upon the ends of the bar M, end pulling teeth $M^1$, $M^1$, upon the extreme ends of which the central vertical and transverse base flanges are tapered forming a tooth point $m^3$. Cast with a profile accurately fitting the angle formed by the vertical and base flanges of the body portion of the main carrying bar M, is a rack or section of pulling teeth N (see Figs. 7 and 8). Cast integrally with the bar or body portion $n^1$ of this rack are a number of angularly projecting parallel pulling teeth $n^2$, each being reinforced with an angular rib $n^3$. A downwardly projecting abutting flange $n^4$ is also cast integrally upon the under forward side of the body portion designed to form a stop abutting against the edge of the base flange of the main pulling bar M, and forming also a reinforced rib which strengthens the rack body transversely at the base or crotches of the teeth. These rack sections are made with teeth of uniform sizes in given sections, but of varying section sizes, designated coarse and fine, the coarse size being adapted to heavy brush of mature growth, the fine to brush of light or stunted growth. A given size, however, is used upon the machine entire at each specific operation selected in accordance with the average "stand" of the growth of brush. Ordinarily each main pulling bar is fitted with two of the tooth rack sections, which are securely bolted to the central vertical flange of the same as shown in Figs. 2, 7 and 8. A reinforcing yoke bar $n^5$ is secured against the side of the central vertical flange opposite the point of juncture of the two tooth rack sections by the midway bolts, for the purpose of strengthening the main pulling bar against fracture or twisting.

Inasmuch as one or more of the cast teeth of a section is the part of the machine most likely to be broken in operation, I construct them in interchangeable sections as shown, with a view to securing maximum economy in the matter of maintenance and the replacing of damaged operative parts. Suitably bolted to the outer sides of the central vertical flange of the end pulling teeth $M^1$, are angularly bent attaching bars $m^4$, $m^4$, the ends of which adjoining the points of the end pulling teeth are turned upwardly therefrom, (see Fig. 8), and a short portion of the extreme ends $m^6$, $m^6$, is bent at nearly right angles to the angular body portions $m^5$, $m^5$, forming curves $m^7$, $m^7$, upon the upper edges thereof. Bolt holes $m^8$, $m^8$, are formed in the ends $m^6$, $m^6$. To the extreme opposite ends $m^9$, $m^9$, of these attaching bars are suitably secured sections of intermediate attaching chains $m^{10}$, $m^{10}$, each of several links in length. In order that these pulling bars may readily adjust themselves to the varying positions into which they are placed upon the endless carrying chains and relative to the adjacent construction, during a complete excursion of movement of the chains around the driving and carrying sprockets H, H, and K, K, I attach them to the carrying chains adjustably by means of the angular attaching bars $m^4$ and the intermediate attaching chains $m^{10}$. Referring to Figs. 1 and 8, into each given pulling bar "section" of the carrying chains L, L, spaced two links in each direction from the center of said section, are inserted two special detachable joint-pin jaw links $L^2$, $L^2$, there being thus interposed between them two standard detachable links $L^1$, $L^1$. To one jaw link $L^2$ is jointedly attached by a bolt $L^3$ the intermediate attaching chain $m^{10}$, and to another jaw link $L^2$ is jointedly attached by a bolt $L^3$ the angular attaching bar $m^4$, thus forming a collapsible connection with one jaw link and a pivotal joint connection with another jaw link. The bar $m^4$ is connected with the conveyer chain by a link $L^2$ located forward of the corresponding link $L^2$ with which the chain $m^{10}$ is attached, assuming that the puller device is mounted on the lower run of the conveyer chain. In this statement the term "forward" is used with reference to the direction of travel of the machine.

A clearing bar O, Fig. 2, transversely disposed within the frame A, and immediately to the rear of the carrying shaft J, is fitted with angular U-shaped end bars $O^1$, $O^1$, which are carried to the front of and around the sprocket wheels K, K, where the extreme outer ends $O^2$, $O^2$, Figs. 4 and 5, are horizontally adjustably bolted to the inner sides of the depending supporting boxes I, I, by bolts $O^3$, $O^3$, secured in elongated slots $i^2$, $i^2$. The end bars $O^1$, $O^1$, are given additional support and anchored against upward springing movement by being bolted to short vertically disposed links $j^1$, $j^1$, mounted upon the shaft J immediately adjoining the inner ends of the sprocket wheel hubs $k^1$, $k^1$. The hub ends $j^2$, $j^2$, of these links $j^1$, $j^1$, also serve as stop-collars whereby the sprockets K, K, are secured upon the shaft J in alinement with the sprockets H, H, upon the driving shaft B.

Main frame corner castings P, P, are suitably bolted at the rear corners of the frame A, to the rear ends of the side beams $A^1$, $A^1$, and the respective adjoining ends of the rear cross beam $A^2$, forming a corner reinforcement to and the assembled completion of the several parts of the frame A. On the inner sides of each of the corner castings are formed integrally therewith vertical angular corner flanges $p^2$, $p^2$, to which are securely bolted the vertical flange members of the respective frame angle irons, while the base flange members are bolted to the main body base $p^3$, $p^3$, of the corner castings, thus affording maximum transverse stability and rigidity to the construction.

The corner castings are strengthened by an angular rib $p^4$, $p^4$, formed integrally upon the under side of the main body base, and also upon the under sides and to the extreme forward ends of these corner castings are formed integrally, downward depending lugs or flanges $p^5$, $p^5$, each having a bolt hole $p^6$, Figs. 1 and 4. Formed integrally upon the outer sides of the adjustable depending supporting boxes I, I, are vertical ribs $i^3$, $i^3$, each having a bolt hole $i^4$ Figs. 1, 4 and 5. Mounted within the bolt holes $i^4$ and $p^6$, are longitudinally disposed tie-bolts 10, 10, used as take-ups in readjusting the supporting boxes I, I, for wearing or other sources of slack occurring in the endless carrying chains L, L.

Vertically disposed shaft supporting boxes $p^7$, $p^7$, are formed integrally upon the corner castings P, P, Figs. 1, 2 and 6, which are supported by flange extensions $p^8$, $p^8$, of the main body base $p^3$, and by angular bracket flanges $p^9$, $p^9$. Vertically disposed shaft holes $p^{10}$, $p^{10}$, are formed in the boxes $p^7$, into which are accurately fitted the vertical ends $q^2$, $q^2$, of the trailing wheel shafts $q^1$, $q^1$, upon the angular, horizontal spindle ends $q^3$, $q^3$, on which are mounted trailing wheels Q, Q, which support and carry the rear end of the frame A. The vertical shaft ends $q^2$, $q^2$, are secured in the boxes $p^7$ by set screw collars $q^4$, $q^4$, and by which collars a limited degree of vertical adjustment of the shafts can be secured.

The rear end of the draft tongue R, shown in Figs. 1 and 2, made preferably of hard wood, is of a length and taper ordinarily given like parts of draft implements. The tongue is secured to the forward ends of the frame side beams $A^1$, $A^1$, by angularly disposed spread irons $r^1$, $r^1$, upon which are formed vertically curved hook ends $r^2$, $r^2$, which engage holes $A^3$, $A^3$ in the forward ends of the frame side beams. These spread irons are strengthened by an iron cross brace $r^3$, and form in conjunction with the main shaft B a supporting cross brace to the forward ends of the frame side beams $A^1$, $A^1$. The rear end of the tongue R is also bolted to the cross brace $r^3$. A four-horse evener $r^4$ reinforced with a truss rod $r^5$ and movement limiting stay chains $r^6$, all of the usual construction, is suitably mounted upon the draft tongue R.

A driving seat comprising the transversely disposed seat platform S and end supporting irons $s^1$, $s^1$, is conveniently mounted upon the side beams of the frame. The rear supporting irons are jointedly secured to the side beams by bolts $s^2$, $s^2$, while the forward irons $s^3$, $s^3$, rest freely upon the base flanges of the side beams. By this arrangement the seat can be tilted backward out of the way when it is desired to secure free access to the driving shaft parts.

In view of the foregoing constructive description, a brief connected reference as to the operation of the mechanism will be readily understood.

Referring to Fig. 2, it will be seen that the pulling bar M and the tooth racks N, attached to the lower strands of the carrying chains L, L, are shown in plan view, while the like parts attached to the upper strands of the carrying chains are shown (necessarily) in inverted plan. In order to avoid obscuring the lines of the figure by drafting these duplicate detail parts in full, which are disposed substantially in a vertical plane, I show one-half of each detail construction and a part of the seat platform as being broken away.

Referring to Fig. 1, when the machine is being drawn forward, the draft wheel E, main shaft B and driving sprockets H, H, rotate in unison in the direction indicated by the arrows, simultaneous with which rotation the carrying chains L, L, with the attached pulling bars M, M, M, M, are being carried upon an excursion of movement in the direction as also indicated by arrows.

With the machine moving forward over the land at a given speed, the under strands of endless carrying chains L, L, with the attached operatively active pulling bars M, M, are being carried forward with the same and engaging and pulling the swath of brush. Meantime, however, the chains and pulling bars are moving rearwardly as compared with the forward movement of the machine, but at a greatly reduced speed ratio, resulting in each actively operative pulling bar clearing a given longitudinal area or section of the swath and gathering or bunching the pulled brush upon the same, until it shall have reached the rear sprockets K, K, when in passing upwardly around the same within the main frame, the side of the brush-loaded moving pulling bar, passes adjacent the fixed protruding clearing bar O, as shown in Figs. 1 and 2, which engages the brush load and releases or sweeps it from the upward moving pulling bar and deposits it in a heap or windrow in the immediate rear of the moving machine. In the meantime the adjoining pulling bar M, mounted upon the carrying chains L, L, has been carried around and beneath the driving shaft B into the position of active operation before the preceding bar, above referred to, has passed from out the operative section. The forward movement of the machine, relative to the rearward movement of the active pulling bars and the longitudinal extent of the mechanical section of active operation, being substantially the distance between the driving sprockets H, H, and the return carrying sprockets K, K, together with the predetermined spaced distances of the several pulling bars upon the carrying chains, affords in the adjoining fields of each bar's section of active operation the necessary lap to insure continuous results and the pulling, gathering and heaping of the brush and producing an unbroken clear swath.

Referring to Fig. 1, it will be seen that as the freely jointed pulling bar M is being carried upward and around the return carrying sprockets K, K, it hangs outwardly therefrom, by force of gravity, to a position determined by the length of the taut attaching chains $m^{10}$, $m^{10}$, passing the clear of the previously adjusted clearing bar O, and that having passed the central vertical plane of the sprockets K, K, it drops by gravity and rests upon the upper strands of the carrying chains L, L, until carried forward to and around the driving shaft B and sprockets H, H, in making the short turn upon which it adjusts itself freely by virtue of the angularly disposed, jointed connecting bars $m^4$, and the angular section $m^5$ and clearance curves $m^7$, as is clearly shown in Fig. 11. Continuing its movement, as shown in Fig. 1, around and beneath the driving sprockets H, H, it will be seen that the connecting chains $m^{10}$ draw the carrying bar end M backward, when it adjusts itself into the operative position as shown by the pulling bar attached to the lower strand of the carrying chains. The trailing wheels Q, Q, adjust themselves freely upon the pivotal vertical shafts $q^2$, $q^2$, in turning and like varying movements of the machine.

Having thus described my invention, what I claim is:

1. In a sage brush pulling machine the combination with a frame, of an endless conveyer mounted to travel thereon, and collapsible brush pulling members carried by the conveyer and spaced, the conveyer being so arranged that its lower run travels rearwardly during the forward travel of the machine, the pulling members being arranged in operative relation for pulling purposes on the rearwardly traveling run of the conveyer.

2. In a machine of the class described the combination with a vehicle, of an endless conveyer mounted to travel thereon, its lower run moving rearwardly during the forward travel of the machine, and collapsible pulling members carried by the conveyer and arranged in operative relation for pulling purposes on the lower rearwardly traveling run thereof.

3. The combination with a vehicle, of an endless conveyer mounted to travel thereon, its lower run moving rearwardly during the forward travel of the machine, and collapsible pulling members carried by the conveyer and arranged in operative relation for pulling purposes on the lower rearwardly traveling run thereof, the rearward travel of the pulling members with the conveyer being slower than the forward travel of the machine, for the purpose set forth.

5. The combination with a vehicle, of an endless conveyer mounted to travel thereon, the conveyer being so arranged on the vehicle that one run thereof is below the other, and means for driving the conveyer so that its lower run travels rearwardly during the forward travel of the machine and at a speed much less than the travel of the machine, brush pulling members collapsibly mounted on the conveyer, the brush pulling members on the lower run of the conveyer being pointed forwardly and their brush pulling function being due to the differential between the forward travel of the vehicle and the rearward travel of the pulling members, substantially as described.

6. The combination with a vehicle, of an endless conveyer mounted on the vehicle, the latter being equipped with means for driving the conveyer to cause its lower run to travel rearwardly during the forward travel of the machine and at a much slower speed, and pulling members collapsibly mounted on the conveyer and arranged in operative relation for pulling purposes on the lower rearwardly traveling run thereof, the pulling members when on the lower run of the conveyer being pointed forwardly, their pulling function being performed by virtue of the differential between the forward movement of the machine and the rearward travel of the pulling members, substantially as described.

7. The combination with a vehicle, of an endless conveyer mounted to travel thereon, driving mechanism mounted on the vehicle and connected to drive the conveyer to cause its lower run to move rearwardly during the forward travel of the machine and at a slower rate of speed, and pulling members composed of a transversely arranged bar and teeth mounted in parallel relation and rigidly secured to the bar, the puller members being collapsibly connected with the conveyer and their teeth being pointed forwardly for brush pulling purposes when traveling rearwardly with the lower conveyer run substantially as described.

8. The combination with a vehicle, of an endless conveyer adapted to travel thereon, driving mechanism with which the vehicle is equipped for moving the conveyer to cause its lower run to travel rearwardly at a slower rate of speed than the forward travel of the machine, a pulling member composed of a transversely arranged bar, teeth rigidly connected with the bar and arranged in parallel relation, each puller member having arms rigidly connected therewith at one extremity and pivotally connected with the conveyer at their opposite extremities, and flexible means also connecting the puller member with the conveyer and located in the rear of the said connecting bars when on the lower run of the conveyer, the teeth of the puller being forwardly directed during its rearward travel with the conveyer, the differential between the forward travel of the machine and the rearward travel of the lower run of the conveyer being sufficient for effective brush-pulling purposes, substantially as described.

9. The combination with a vehicle, of an endless traveling conveyer mounted thereon, the vehicle being equipped with means for driving the conveyer to cause its lower run to travel rearwardly during the forward travel of the machine, the lower conveyer run traveling rearwardly at a less rate of speed than the forward travel of the machine, and a puller member comprising a frame work and teeth rigidly connected therewith, the puller member having angle bars projecting from one extremity thereof and pivotally connected with the conveyer, chains connecting the opposite extremity of the puller member with the conveyer, the puller member being arranged to have its teeth forwardly directed when on the lower run of the conveyer, the differential between the rearward travel of the puller member with the conveyer, and the forward travel of the machine, being sufficient for effective work, substantially as described.

10. The combination with a vehicle, of an endless conveyer adapted to travel thereon, the vehicle being equipped with means for driving the conveyer to cause its lower run to travel rearwardly at a less rate of speed and simultaneously with the forward travel of the machine, a collapsible puller member connected with the conveyer and having its forward extremity foremost when on the lower run of the conveyer, whereby the puller member performs its pulling function by virtue of the differential between the forward travel of the machine and the rearward travel of the puller member with the conveyer, and means mounted on the rear portion of the vehicle for clearing the puller member of brush during its upward movement from the lower run position to the upper run position, substantially as described.

11. The combination with a vehicle, of an endless traveling conveyer mounted thereon, the vehicle being equipped with means for driving the conveyer at a slower rate of speed than the forward travel of the vehicle and to cause its lower run to travel rearwardly during the forward travel of the machine, collapsible puller members carried by the conveyer and spaced, each member having teeth which are forwardly directed when on the lower run of the conveyer, and means mounted on the rear part of the conveyer for removing the material caught by the teeth of the puller member as the latter moves upwardly in changing its position from the lower to the upper run of the conveyer, said means including a horizontally disposed bar located forward of the brush pulling member during the brush-removing operation, substantially as described.

12. The combination with a vehicle, of an endless traveling conveyer mounted thereon, the vehicle being equipped with means for driving the conveyer at a slower rate of speed than the forward travel of the vehicle and to cause the lower run of the conveyer to travel rearwardly during the forward travel of the machine, a puller member spaced on the conveyer and having its forward part extending forwardly when on the lower run of the conveyer, and a transversely arranged clearing bar mounted on the rear portion of the machine and arranged to occupy a position forward of the puller member during its upward travel from the lower to the upper run of the conveyer, the said bar having forwardly directed arms located at the opposite extremities of the brush-pulling portion of the puller member, substantially as described.

13. The combination with a vehicle, of an endless conveyer mounted thereon, the vehicle having a forwardly located driving axle equipped with sprocket wheels with which the conveyer is operatively connected for driving purposes, a shaft located on the rear portion of the machine and equipped with sprockets with which the conveyer is also operatively connected, one of the vehicle wheels being made fast to the forward axle for driving purposes, the driving mechanism being arranged to cause the conveyer to travel at a slower rate of speed than the travel of the vehicle and to cause the lower run of the conveyer to travel rearwardly during the forward travel of the machine, and puller members collapsibly connected with the conveyer, the said members being spaced on the conveyer and having teeth which are forwardly directed when on the lower run of the conveyer for utilizing the differential between the rearward travel of the lower conveyer run and the simultaneous forward travel of the machine.

14. The combination with a vehicle having a forwardly located driving axle equipped with sprocket wheels and a rearwardly located shaft also equipped with sprocket wheels, an endless conveyer including two chains adapted to engage in operative relation the sprocket wheels of the driving axle and said shaft, puller members collapsibly connected with the conveyer and having teeth which are forwardly directed when on the lower run of the conveyer, the driving mechanism of the conveyer being arranged to cause the conveyer to travel slower than the travel of the machine and to cause the lower run of the conveyer to travel rearwardly during the forward travel of the machine, and clearing means mounted on the rear of the machine and arranged in operative relation with the puller members, substantially as described.

In testimony whereof I affix my signature in presence of two witnesses.

FINLEY R. LAUNE.

Witnesses:
A. J. O'BRIEN,
F. E. BOWEN.

---

Copies of this patent may be obtained for five cents each, by addressing the "Commissioner of Patents, Washington, D. C."